B. ROEZL.
Hemp Brake.
No. 68,905.
Patented Sept. 17, 1867.
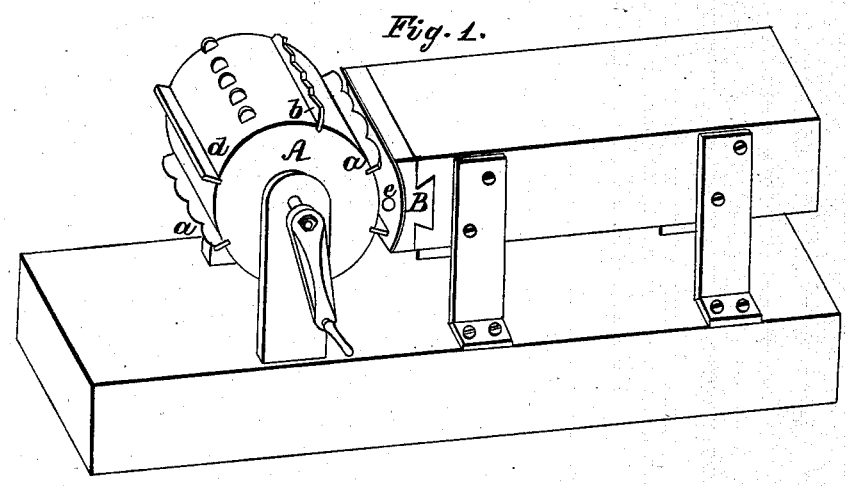
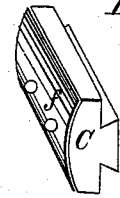

United States Patent Office.

BENITO ROEZL, OF SANTO-COMAPAM, MEXICO.

*Letters Patent No. 68,905, dated September 17, 1867.*

---

MACHINE FOR CLEANING HEMP, RAMIE, &c.

---

The Schedule referred to in these Letters Patent and making part of the same.

---

TO ALL WHOM IT MAY CONCERN:

Be it known that I, BENITO ROEZL, of Santo-Comapam, Mexico, have invented a certain new, useful, and improved Machine and Process for Extracting and Cleaning the Fibre of Ramie, (*Boehmeria tenacissima*,) Hemp, and other like vegetable products; and I do hereby declare the following to be a full, clear, and exact description of the same, reference being had to the annexed drawings, making a part of this specification, in which—

Figure 1 is a perspective view of my machine as when ready for the first operation in my process, and Figure 2 a detached view of a certain alternate part of my machine.

My machine consists of a metallic cylinder of thirty-six inches diameter, more or less, and eighteen inches, more or less, in length, which is driven by any suitable machinery or motive power, when the machine is in operation, at the rate of from three to four hundred revolutions a minute. This cylinder is provided with transverse bars or knives of metal at four inches distance from one another, and projecting or rising half an inch from the perimeter of the same. The knives are of four descriptions, and they are placed alternately or in such manner that no two of the same kind are next each other. The shape and arrangement of the knives may be clearly seen at $a\ b\ c\ d$, fig. 1.

Another part of my machine is a table edge, that is placed a little distance from the ends or points of the knives, which is faced or covered by a thin metallic plate, as shown at $e$ upon the drawings. As the plants to be freed of their gum, wood, &c., undergo two distinct operations, there must be two machines, or the equivalent of two machines, in one of which the metallic edge must be concave and in the other convex. I construct my table in such manner that the metal-covered edge is adjustable and removable, so that either the concave or the convex form can be used at the pleasure of the operator, and hence my machine performs the work of two machines. The table edges, although removable and adjustable whenever it is necessary to substitute one for the other, or to reduce or increase the open space between them and the cylinder, are yet immovable when the machine is in operation, and herein my machine differs from all others designed to accomplish a similar object of which I have any knowledge, including Sandford's and Mallory's machines, as patented in 1862, for in all other machines a yielding or elastic table edge or surface is used for holding the plants to the action of the knives.

Upon the drawings the cylinder is marked A, the alternate series of knives $a\ b\ c\ d$, the concave table edge B, the convex edge C, and the metallic facing of the table edges $e$ and $f$. The cylinder may be of the form shown on the drawings, or it may consist of a hollow drum with open ends; but in any and all forms that may be adopted it must always have a closed circumferential surface or perimeter.

I proceed now to describe the process by which I reduce the plants to a fit condition for use and the operation of my machine.

The hemp or like plants freshly pulled, and the ramie or like plants freshly cut, the roots remaining in the ground, the operator takes a handful of them in his right hand, grasping them two feet or thereabouts from the lower end, and motion being given to the cylinder, he presents them against the knives across the metal-covered edge of the table, when the action of the knives strips off the leaves, scrapes away the bark, and takes out the woody substance and three-fourths of the resinous or gummy matter, the rubbish falling upon the ground and the fibre being unhurt. The operator then subjects the other end of the plants in the same way to the operation of the knives with a like result as above, and the plants are thus cleaned throughout their whole length. This first operation is performed with the concave edge adjusted upon the table. The operator then takes six skeins or hanks of fibre thus prepared and uniting them places them in water to steep and decompose or soften the remaining one-fourth of the gum. This mass of fibres, after being thoroughly saturated, is again subjected to the action of the machine, the concave table edge having been removed, and the convex edge substituted in its stead. The effect of this second operation is to make the fibres quite soft and white, and to spread them out like cloth. They are next placed in a solution of common lye soap and water, heated nearly but not quite to the boiling point, in which they are permitted to remain a few hours. They are then withdrawn from the solution, and, being dried, are ready for manufacture, packing for shipment, or any other use.

Having thus described my invention, that is to say, my machine, as well as my process or method of reducing the fibre of ramie and other like plants to a suitable condition for use, what I claim, and desire to secure by Letters Patent, is—

1. The alternate concave and convex metallic covered table edges B and C, constructed and applied substantially as and for the purpose set forth.

2. The manner of securing the removable table edges B and C, whereby they are made rigid or immovable when the machine is in operation.

3. The revolving cylinder A, armed with knives projecting from its perimeter, for breaking up and extracting the wood, &c., from the fibre of ramie and other like plants, in combination with the removable table edges, applied and operating substantially as described.

4. The method or process herein described of extracting the fibre from ramie and other like plants, consisting in first subjecting the plants to the action of the machine herein described, then soaking them in water, again subjecting them to the action of the machine, and, finally, placing them in a hot solution, as described.

B. ROEZL.

Witnesses:
GUILLERMO SUCHANET,
JOHN B. COOPER.